Dec. 16, 1941.  E. J. MARTIN ET AL  2,266,316
FLUID FLOW INDICATOR
Filed June 20, 1940

Inventors
Edward J. Martin,
Carl E. Grinstead &
Robert U. Frawley
By Blackmore, Spencer & Reid
Attorneys Patented Dec. 16, 1941

2,266,316

UNITED STATES PATENT OFFICE 2,266,316

FLUID FLOW INDICATOR

Edward J. Martin, Carl E. Grinstead, and Robert N. Frawley, Detroit, Mich., assignors to General Motors Corporation, Detroit, Mich., a corporation of Delaware Application June 20, 1940, Serial No. 341,510

7 Claims. (Cl. 73—194)

The object of this invention is an electrical capacity type fluid flow indicating pick up element, adapted to be used in a suitable electrical circuit, for determining velocity of flow.

It is especially suitable for measuring the direction and instantaneous velocity of gas flow in the manifolds of internal combustion engines.

The device essentially consists of a fixed condenser element, spaced from a condenser element capable of minute deflection, the degree of separation of the condenser elements and hence the electrical capacity of the device in a suitable electric circuit, being varied by forces due to the velocity of the flowing medium whose rate of flow is to be measured.

Changes in the capacity of the indicator may influence any suitable sensitive recording devices such as meters and oscillographs in known manner.

The object of the invention is a fluid flow indicator which is comparatively rigid, with a natural frequency of vibration many times higher than those encountered in the flowing medium.

Another object of the invention is an indicator of a form which will have a minimum of interference with the fluid stream and is not sensitive to ambient pressure or vibration.

A still further object of the invention is an indicator in which the deflectable condenser element is constituted by a sealed tube forming a hollow reed, enclosing a stationary fixed condenser element suitably spaced therefrom.

The above and other objects of the invention will be apparent as the description proceeds.

According to the invention, the hollow reed is formed as part of the body of the indicator and extends across the fluid stream whose rate of flow is to be measured. The hollow reed totally encloses a fixed condenser element extending substantially the whole length of the reed but suitably spaced therefrom to provide a variable capacity changing as the hollow reed is deflected by the flow of fluid striking it.

The drawing shows a construction according to the invention. In the drawing.

Referring now to Figs. 1 to 4, the body 1 of the indicator is provided with a screw threaded portion 2, through which it is secured in position in the pipe 3, in which the direction and velocity of fluid flow is to be measured.

Figure 1:
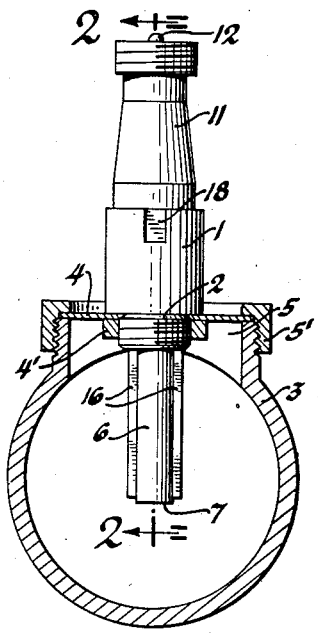
Fig. 1 is a view of the electrical capacity type indicator pick up mounted in a pipe in which the direction and velocity of fluid flow is to be measured.

As shown in Fig. 1, the indicator is secured in the center of a thin disc 4, by a lock nut 4'. The disc 4 is secured at its periphery to a port 5 in the pipe 3, by a clamping nut 5'. The disc 4 not only seals the port 5 but constitutes a flexible mounting to isolate the instrument from any severe vibrations.

Extending integrally from the screwed portion 2 of the indicator in a direction across the fluid stream is a hollow reed or tube 6 with a closed end 7. The hollow reed 6 constitutes the deflectable condenser element.

Secured within the body 1, and suitably insulated therefrom in known manner, is a central electrode 8, with an elongated tubular extension 9 projecting into, but spaced from the hollow reed 6. The extension 9 constitutes the fixed condenser element.

An electrode shield 11 surrounds that portion of the electrode 8 extending outside the body 1.

The body 1 and hence the hollow reed condenser element are suitably grounded, while at 12 there is provision for a cable connection to the electrode 8 and hence to the fixed condenser element 9.

It will be appreciated that the tubular parts 6 and 9 forming the condenser elements must not both be symmetrical about their longitudinal axis, and coaxial, for the reason that any increase in capacity between two adjacent sides thereof as the tubes are deflected relatively to one another would be offset by a decrease in capacity between the opposite adjacent sides, and there would be no change in capacity whatever in the device as a whole. For this reason and while the tubular parts 6 and 9 are conveniently coaxial, the part 9 has a portion 13 which is reduced in external diameter, and hence thickness, around half of the circumference. The distance between the smaller side 13 of the part 9 and the outer tube 6 is many times greater than the distance between the thicker and larger side 14 of the part 9 and the outer tube 6, so that capacity changes between the portion 13 and the tube 6 are negligible, compared with those between the portion 14 and the tube 6 between which the change in capacity occurring with relative deflection is measured. In the example illustrated, the distance between the portion 14 and the tube 6 is of the order of .001 of an inch but is exaggerated in the drawing for the sake of clarity.

Figure 3:
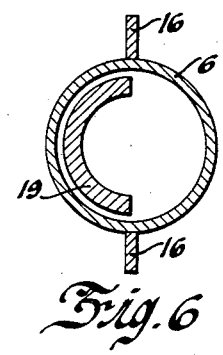
Fig. 3 is an enlarged sectional view on line 3—3 of Fig. 2.

It will be seen that the greatest change in capacity with a given relative deflection of the parts 6 and 9 will occur when the deflection is in the plane A—A of Fig. 3, (i. e. in the direction in which the greatest change in the degree of separation of the greatest areas of the parts 6 and 9 is affected).

The hollow reed or tube 6, is provided with external diametrically opposite radial fins 16 to provide a greater surface area for the velocity effect of the fluid stream to act upon, and the device is assembled with these fins normal to the direction A—A, or normal to the direction in which the greatest change in capacity for a given relative deflection of the parts takes place.

If the direction of the fluid flow to be measured is known, the device is held in the fluid stream with the fins 16 normal to the direction of flow.

If the direction of fluid flow is not known, the device may be turned or oriented about its axis to that position in which the capacity change is greatest; the position of the slots 18 in the body 1 (which as illustrated are normal to the fins 16) will then be an indication of the direction of flow.

Figure 2:
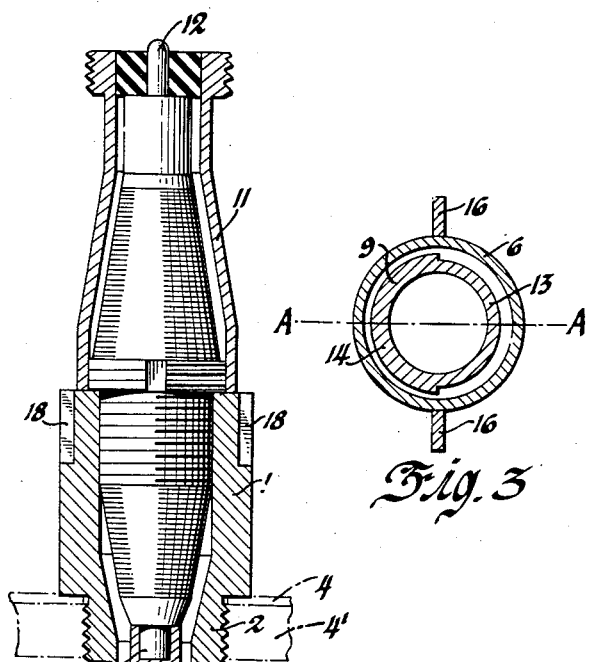
Fig. 2 is an enlarged sectional view of the indicator pick up shown in Fig. 1.
Figures 4, 5:
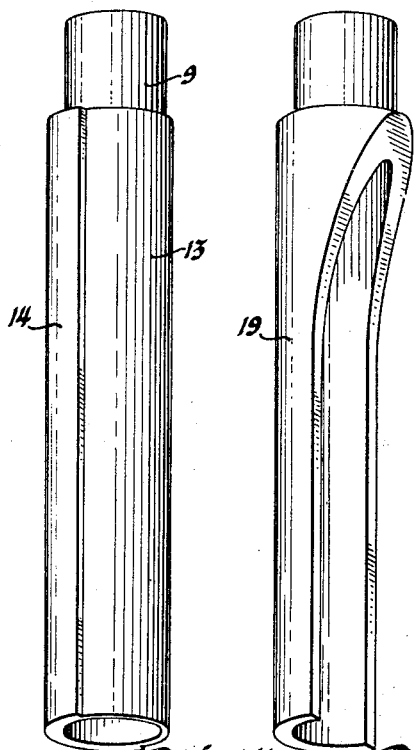
Fig. 4 is an enlarged perspective view of a part of Fig. 3 forming the fixed condenser element of the device.
Fig. 5 is an enlarged perspective view of an alternative form of fixed condenser element.
Figure 6:
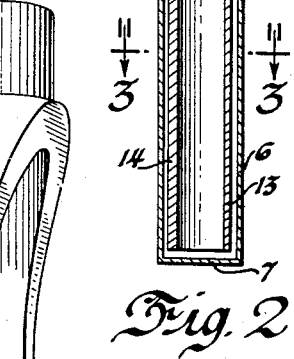
Fig. 6 is a view similar to Fig. 3 with the substitution of the fixed condenser element of Fig. 5.

The alternative fixed condenser element 19 of Figs. 5 and 6 is of half circular section throughout the greater part of its length, and is essentially the tubular fixed condenser element 9 of Figs. 2, 3 and 4 with the unnecessary half portion 18 removed.

If desired, the space between the fixed and deflectable condenser elements may be filled with any suitable dielectric material.

The use of a closed hollow reed as the deflectable condenser element enclosing the fixed condenser element, removes the possibility of moisture or foreign matter entering the indicator and "shorting" the condenser elements.

The cylindrical construction of the deflectable condenser element produces a very rigid member with a natural frequency which may be as high as 4500 cycles per second, that has little tendency to distort, while being sufficiently sensitive to record deflections by the fluid stream, because the capacity change takes place at the point of maximum deflection of the reed and along almost its entire length.

The electrical capacity of the indicator, due to the separation of the condenser elements as shown, may be part of a tuned circuit in an oscillator detector unit. Any variation of capacity in the indicator caused by deflection of the hollow reed will change the tuning of the indicator circuit and thus change its response to a constant frequency generated by a stable oscillator. Any change of response may be amplified by a suitable amplifier before it is passed to a viewing or recording oscillograph, all in known manner.

We claim:

1. In a fluid flow indicating pick up device of the electrical capacity type in which the degree of separation of a fixed condenser element and a deflectable condenser element is varied by force due to the rate of flow of the fluid stream to be measured, and changes the electrical capacity of the device in a suitable electrical circuit, a deflectable condenser element constituted by a hollow reed the axis of which extends from the body of the device in a direction across the fluid stream, and a fixed condenser element secured to one end of a central electrode insulated from but securely held in the body of the device, said fixed condenser element projecting into the hollow reed, being closely spaced from one side thereof and spaced a relatively large distance from the opposite side thereof, the capacity change of the device for a given relative deflection of the parts being greatest when the device is so oriented about the axis of the hollow reed that the latter is deflected in a direction to vary the degree of separation between the more closely spaced sides of the fixed and deflectable condenser elements, whereby the position of orientation of the device in which the capacity change is greatest will be an index to the direction of fluid flow, and the actual capacity change in that position will be a measure of the rate of fluid flow in that direction.

2. The combination according to claim 1, in which the hollow reed condenser element is provided with two radial fins disposed diametrically opposite each other in a plane normal to that direction of deflection of the hollow reed in which the capacity change of the device for a given deflection is greatest.

3. The combination according to claim 1, in which the fixed condenser element is of tubular form coaxial with the hollow reed, but is reduced in external diameter and thickness around half of its circumference, whereby the reduced portion is spaced from the hollow reed by a distance many times greater than the remaining portion of the fixed condenser element and the hollow reed.

4. The combination according to claim 1, in which the end of the hollow reed is closed.

5. The combination according to claim 1, in which the fixed condenser element is of half circular cross-section concentric with the hollow reed.

6. The combination according to claim 1, in which the hollow reed is integral with the body of the device.

7. An electrical condenser having condenser elements constituted respectively by a member which is a tubular extension of the body of the device, and a member securely held in the body of the device but insulated therefrom and projecting into the tubular extension from which it is suitably spaced, closely to one side thereof and a relatively large distance from the opposite side thereof, said tubular extension being in the form of a hollow reed which is deflectable by a force transverse to its axis to vary the degree of separation between the members, and hence the capacity of the condenser.

EDWARD J. MARTIN.
CARL E. GRINSTEAD.
ROBERT N. FRAWLEY.